(12) United States Patent
Romainczyk et al.

(10) Patent No.: US 9,626,415 B2
(45) Date of Patent: *Apr. 18, 2017

(54) DATA REDUCTION WITH SPECIFIED CONSTRAINTS

(71) Applicant: NATIONAL INSTRUMENTS CORPORATION, Austin, TX (US)

(72) Inventors: Stefan R. Romainczyk, Raeren (BE); Michael C. Popa, Aachen (DE); Victor M. Hall, Aachen (DE); Phi Hai Huynh, Wuerselen (DE); Klaus Stefan Zölsch, Stolberg-Breinig (DE)

(73) Assignee: NATIONAL INSTRUMENTS CORPORATION, Austin, TX (US)

(*) Notice: Subject to any disclaimer, the term of this patent is extended or adjusted under 35 U.S.C. 154(b) by 34 days.

This patent is subject to a terminal disclaimer.

(21) Appl. No.: 14/720,558

(22) Filed: May 22, 2015

(65) Prior Publication Data

US 2015/0269233 A1  Sep. 24, 2015

Related U.S. Application Data

(63) Continuation of application No. 13/958,871, filed on Aug. 5, 2013, now Pat. No. 9,158,826.

(60) Provisional application No. 61/680,113, filed on Aug. 6, 2012.

(51) Int. Cl.
  *G06F 7/00* (2006.01)
  *G06F 17/30* (2006.01)

(52) U.S. Cl.
  CPC .. *G06F 17/30554* (2013.01); *G06F 17/30864* (2013.01)

(58) Field of Classification Search
  CPC ......... G06F 17/30864; G06F 17/30554; G06F 11/3006
  USPC .......................... 707/722, 723, 736, 769, 770
  See application file for complete search history.

(56) References Cited

U.S. PATENT DOCUMENTS

| | | | |
|---|---|---|---|
| 7,302,440 B2 | 11/2007 | Britton | |
| 8,290,346 B2 | 10/2012 | Ernst | |
| 2010/0122270 A1 | 5/2010 | Lin | |
| 2011/0124996 A1* | 5/2011 | Reinke | A61M 5/14248 600/365 |

* cited by examiner

*Primary Examiner* — Md. I Uddin

(74) *Attorney, Agent, or Firm* — Meyertons Hood Kivlin Kowert & Goetzel, P.C.; Jeffrey C. Hood; Mark S. Williams

(57) ABSTRACT

System and method for rendering data with specified constraints. A request for data from a data set may be received. The data set may include time-stamped historical data, including multiple reduced data sets, each having a respective resolution. The request may specify a time frame. A first reduced data set of the reduced data sets may be determined based on the specified time frame. First data from the first reduced data set corresponding to the specified time frame may be retrieved, and are usable for display on a display device. The data set may be generated from received raw data, where the raw data includes time-stamped historical data at a first resolution. The raw data may be reduced via multiple stages, thereby generating the reduced data sets at their respective resolutions. The reduced data are generated and represented in a way that is visually pleasing and technically accurate.

18 Claims, 12 Drawing Sheets

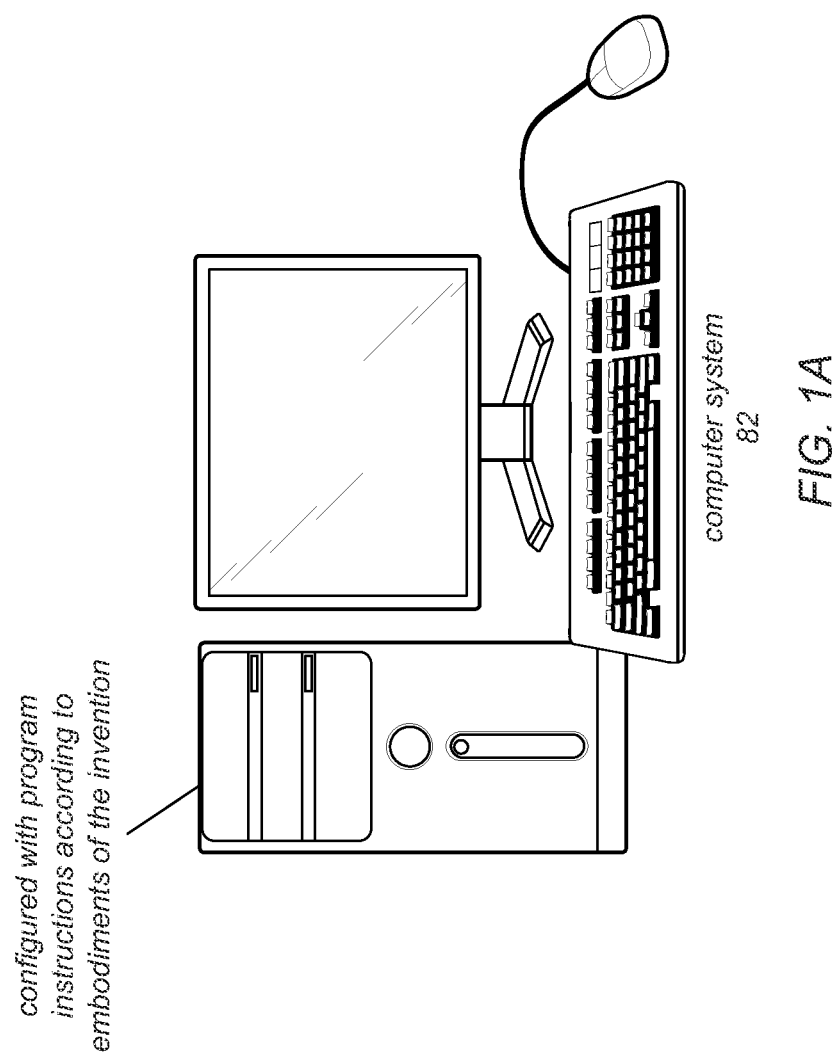

DATA REDUCTION WITH SPECIFIED CONSTRAINTS

CONTINUATION DATA

This application is a Continuation of U.S. application Ser. No. 13/958,871, titled "Data Rendering With Specified Constraints", filed Aug. 5, 2013, whose inventors were Stefan R. Romainczyk, Michael Popa, Victor Hall, Hai Huynh, and Stefan Zoelsch, issued as U.S. Pat. No. 9,158,826, which claims benefit of priority to U.S. Provisional Application Ser. No. 61/680,113, titled "Data Rendering With Specified Constraints", filed Aug. 6, 2012, whose inventors were Stefan R. Romainczyk, Michael Popa, Victor Hall, Hai Huynh, and Stefan Zoelsch, which is hereby incorporated by reference in its entirety as though fully and completely set forth herein.

FIELD OF THE INVENTION

The present invention relates to the field of data retrieval, and more particularly to a system and method for data rendering with specified constraints.

DESCRIPTION OF THE RELATED ART

Data rendering refers to querying and retrieving a subset of data values defined by a specified time frame and/or a specified number of values. This functionality becomes increasingly important as larger data sets are involved.

A common use case is to display historical data of data channels, e.g., in National Instruments Corporation's Technical Data Cloud (TDC), wherein data channels of specified data types generate (e.g., stream) data, e.g., which may be sent to storage where it can subsequently be retrieved and viewed or analyzed. TDC channels may store a huge amount of data over time. Generating quick views on such data for a certain time frame, e.g., a specified month, requires fetching all available data for the specified time, and returning it to the client. In cases of larger datasets this can lead to many problems. Since defined time frames in requests may contain millions of data points, resulting in poor response performance, the need for many requests to get the desired data, increased costs because of iterating over the entire data set, and so on. Furthermore, returning huge result sets can lead to problems with some chart libraries. For example, JavaScript chart libraries have problems when the data sets consist of more than a few thousand data points. Additionally, the resolution of typical small mobile displays is limited to a few thousands of pixels, e.g., Apple Inc.'s iPad™ 2: 1024×768, iPad™ 3: 2048×1536. More generally, some common display resolutions for computers and workstations are: 2560×1440, 1920×1200, 1680×1050, 1440×900, 1280×800. In order to illustrate quick views of data for a specified time frame on such devices, the need of compact, reduced and optimized datasets for these display resolutions arises.

SUMMARY OF THE INVENTION

Various embodiments of a system and method for data rendering with specified constraints are presented below.

A request for data from a data set may be received, e.g., from a client or user, where the data set includes time-stamped historical data, including a plurality of reduced data sets. Each reduced data set may have a respective resolution. The request may specify a time frame. A first reduced data set of the plurality of reduced data sets may be determined (selected) based on the specified time frame, and first data may be retrieved from the first reduced data set, where the first data corresponds to the specified time frame. The first data may be usable for display on a display device.

In some embodiments, the reduced data sets may be generated in the following manner. Raw data of the data set may be received, where the raw data includes time-stamped historical data at a first resolution. The raw data may be reduced, e.g., in multiple stages, thereby generating the reduced data sets at their respective resolutions. The reduced data sets may be stored in a memory medium.

The reduction approach may be optimized for displaying data in charts (or graphs, or other graphical presentation means). For example, if the typical or expected display device is only capable of displaying, say, three thousand data points, then returning more than this amount may not be useful, and may thus require more bandwidth than necessary. Additionally, such larger than necessary data returns may require further reduction of the data for actual display on the device. Accordingly, in one embodiment, the request may further specify a constraint on return data size, i.e., may specify a return data constraint. Retrieving the first data from the first reduced data set may include retrieving initial data from the first reduced data set, where the initial data has an initial size at an initial resolution, and where the initial size fails to meet the specified return data constraint, and further reducing the initial data to an adjusted size that is less than the initial size, and meets the constraint, e.g., in some embodiments, is of or on the order of the amount of the specified return data constraint, thereby generating the first data, which may be returned to the user or client. In other words, the method may dynamically reduce the retrieved initial data to an even lower resolution to meet the size constraint specified by the request. Note, however, that in some embodiments, the specified return data constraint may be a soft constraint (as opposed to a hard constraint). In other words, the method may attempt to meet the constraint, and may reduce the initial data size some, based on the specified return size, but may not force the result to be specifically less than, equal to, or greater than the specified return data constraint. In some embodiments, the final return data size may never exceed $2*n+2$ of the requested (specified return) data constraint, where n is the value of the constraint in intervals, although in other embodiments, this particular relationship may differ. Thus, the specified return data constraint, which may be in terms of intervals, may not be in the same units as the return data size, which may be in terms of data points, as explained in detail below.

In some embodiments, the actual returned data size may be related to and limited or constrained by the specified return data constraint, but may not be numerically less than, equal to, or greater than, the specified return data constraint, depending on the actual channel data, the used reduction stages and the performed optimization steps. For example, the return data size may be in different units than the specified return data constraint (which may be in terms of "intervals" or "x-pixels"), as will be described below. In some embodiments, the selection of the reduced data set may include selecting the reduced data set with the highest resolution possible that will keep the return data size within the specified bounds.

Thus, depending on the defined time frame of a request from a client (or user), the method may dynamically analyze which reduced data set, e.g., which data stage of which resolution, is adequate, and may fetch the specified data from that reduced data set and return the fetched data to the client (or user). Note that in general, the longer the time frame of the request, the lower the resolution (and thus, higher reduction) of the returned data set. For example, requesting the data of a month may result in receiving data at a resolution of a data point per hour, while requesting the data of just the last day of that month may result in receiving data at a resolution of a data point per minute. Thus, with each request, an amount of data within some specified range may be returned, independent of the time frame specified in the request, e.g., a maximum of a few thousands data points.

In one exemplary embodiment, the reduced data sets may be specified or organized in terms of (e.g., time) "intervals", where each interval includes up to some specified number of data points, possibly dependent on the data type of the data points in the data set, e.g., up to 4 points for data points of type "double", or up to 2 points for "geographic" data type, e.g., latitude, longitude, and elevation, as noted above. The following description is in terms of the former, although the particular values used are meant to be exemplary only, and other values may be used as desired, depending on the application and/or data type.

In some data sets, the data may not be exactly regular, time-wise (or with respect to some other independent variable), and so, given a specified interval size in the original (raw) data set, e.g., 1 minute, etc., with an upper bound on the number of points per interval, e.g., 4, there may be some intervals with no data points, and others with 1, 2, 3, or 4 data points. Now, when any requested data are returned for display, the rendering software (and/or hardware) simply takes the returned data points, and connects them in order. Depending on the reduction techniques used to generate the various reduced data sets, this could result in unwanted artifacts in the display of the returned data, e.g., if the reduction process retained uncharacteristic data points for a reduced interval. Embodiments of the present approach may facilitate compression of a given interval (e.g., containing up to 4 data points) to a reduced width of one pixel (on an expected display) with a vertical spread or height that represents the range of the data over that interval. Subsequently, when the data are displayed, each interval may be represented by a vertical line, 1 or more pixels in length, which results in a display of the data that is visually pleasing and technically accurate.

Accordingly, in one embodiment, the reduction process may determine, per interval, one or more characteristic data points for the interval, specifically, first, last, minimum, and maximum, data points in the interval, which may serve to characterize the data for that interval. Such characteristic data points may be used to guide the reduction process such that when the reduced data are returned and displayed, the displayed data properly represent the original (raw) data at the reduced level of resolution at which the data are displayed.

For example, consider an exemplary case of four adjacent intervals, A, B, C, and D, where interval A includes 4 data points, interval B contains no data points, interval C includes 1 data point, and interval D includes 3 data points. Now, interval A has first and last data points, and thus has well-defined connection points for adjacent intervals (first and last points), and further has min and max points, and thus a characterized data range or spread (min and max points). Interval B has no points, and thus may be represented by simply connecting the last point of interval A and the first point of interval C. In other words, no data points are synthesized, but the adjacent data may suffice to visually render the empty interval as simply connecting data of the two adjacent intervals. Interval C includes 1 data point, which thus fills the roles of min, max, first, and last, data points, and thus provides a clear connection to previous and subsequent data points. Finally, interval D, which includes only 3 data points, is still guaranteed to have a first point, a last point, a min point, and a max point, but two or more of these characteristic points may be the same point; e.g., the first point may be the minimum, the last point may be the maximum, etc., and thus, the data of interval D may thus simply be connected to the single point of interval C via the first point of interval D. Thus, even though intervals may have zero to 4 data points, the interval may still be properly characterized, either by the 1-3 characteristic data points of the interval, or, in the case of zero data points, characteristic points of the adjacent intervals.

Describing the above in a slightly different way, in some embodiments, the first reduced data set may be specified or organized in intervals along an independent axis, where each interval includes between zero and a specified number of data points. The method may further include: for each interval that includes one or more data points, determining one or more characteristic data points for the interval, including first, last, minimum, and maximum data points in the interval. The characteristic data points for the interval characterize the data for that interval, and the one or more characteristic data points may be associated with a respective single value on the independent axis for the interval.

The intervals may be displayable in the following manner:

For intervals that include one or more data points: a vertical line may be presented (displayed) at the respective single value on the independent axis for the interval, where endpoints of the vertical line are values on the dependent axis of the minimum and maximum data points for the interval. The vertical line may be connected to an immediately previous interval that includes one or more data points via a line from the last data point of the immediately previous interval to the first data point of the interval, where the connecting crosses any intervening empty intervals between the interval and the immediately previous interval that includes one or more data points. Similarly, the vertical line may be connected to an immediately subsequent interval that includes one or more data points via a line from the last data point of the interval to the first data point of the immediately subsequent interval, where the connecting crosses any intervening empty intervals between the interval and the immediately subsequent interval that includes one or more data points.

Accordingly, any returned data whose intervals retain the above characteristics may unambiguously be rendered by display software/hardware.

BRIEF DESCRIPTION OF THE DRAWINGS

A better understanding of the present invention can be obtained when the following detailed description of the preferred embodiment is considered in conjunction with the following drawings, in which:

FIG. 1A illustrates a computer system configured to implement embodiments of the present invention;

Figure 1B:
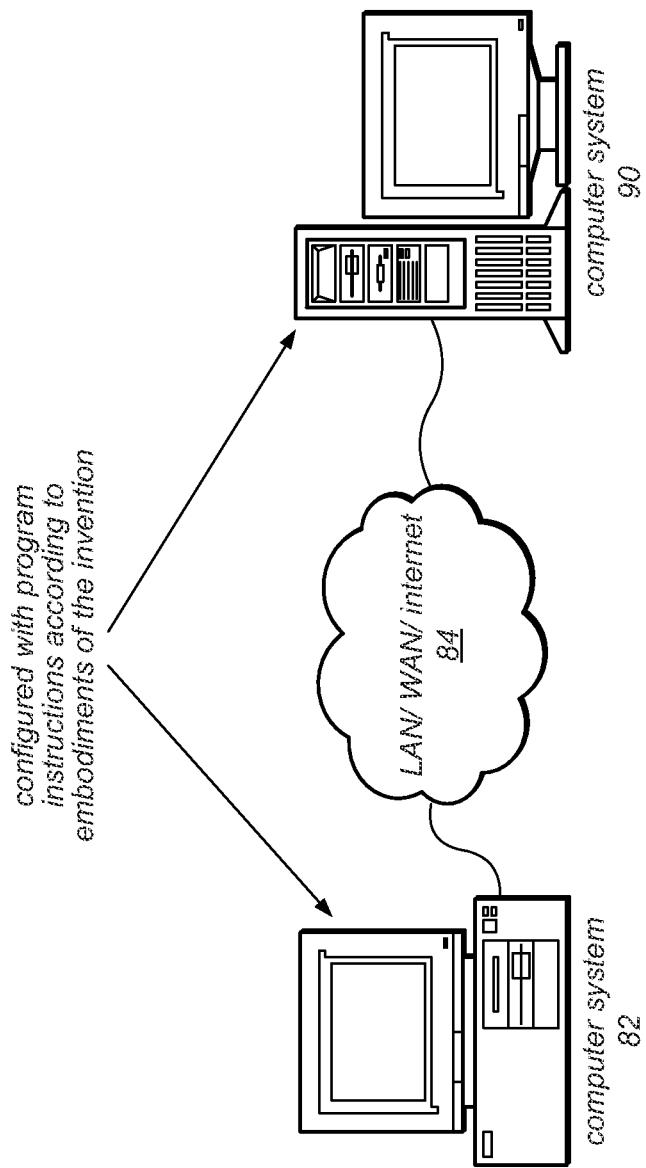
FIG. 1B illustrates a network system comprising two or more computer systems that may implement an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Provisional Application Ser. No. 61/680,113, titled "Data Rendering With Specified Constraints", filed Aug. 6, 2012.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

TERMS

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DIADem™ and Matrixx/System-Build™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Data rendering—refers to querying and retrieving a subset of channel values defined by a specified time frame and/or a specified number of values.

FIG. 1A—Computer System

FIG. 1A illustrates a computer system 82 configured to implement embodiments of the present invention. One embodiment of a method for rendering data according to specified constraints is described below.

As shown in FIG. 1A, the computer system 82 may include a display device configured to render data according to specified constraints, e.g., via a graphical user interface (e.g., a front panel of a graphical program). The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more programs, e.g., graphical programs, which are executable to perform the methods described herein. Additionally, the memory medium may store a programming development environment application used to create and/or execute such programs. The memory medium may also store operating system software, as well as other software for operation of the computer system. Various embodiments further include receiving or storing instructions and/or data implemented in accordance with the foregoing description upon a carrier medium.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program, e.g., a graphical program, in a distributed fashion. For example, computer 82 may execute a first portion of a block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the program may be displayed on a display device of the computer system 82, and the main (i.e., non-GUI) portion of the program may execute on a device coupled to the computer system 82. In a similar embodiment where the method is implemented via a graphical program, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the program may be downloaded and executed on the device. For example, an application development environment with which the program is associated may provide support for downloading a program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
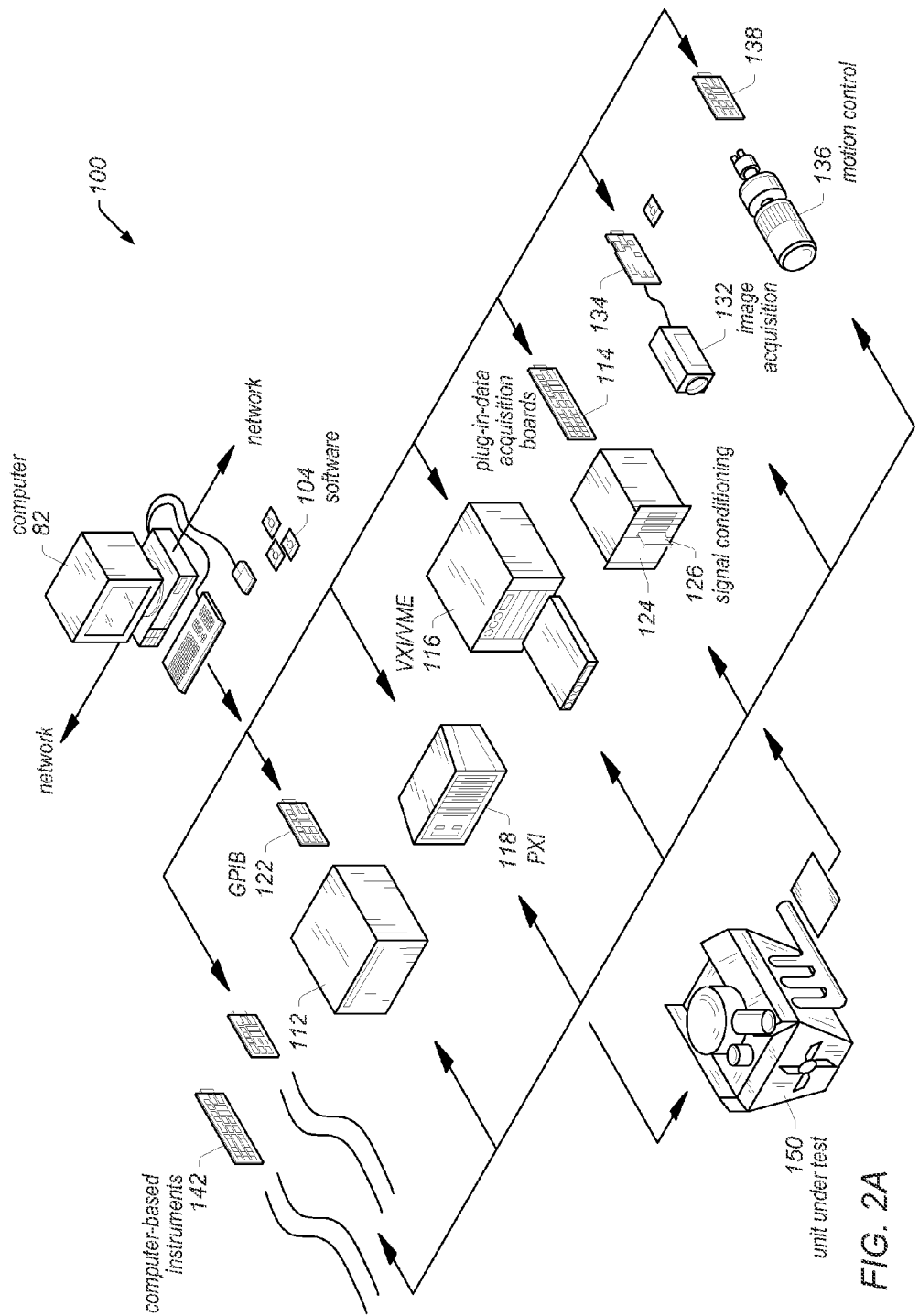
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. For example, the data rendering techniques disclosed herein may be used to view or analyze data generated with respect to the UUT or process 150. The system 100 may be used in a data acquisition and control application, in a test and measurement application, an image processing or machine vision application, a process control application, a man-machine interface application, a simulation application, or a hardware-in-the-loop validation application, among others.

Figure 2B:
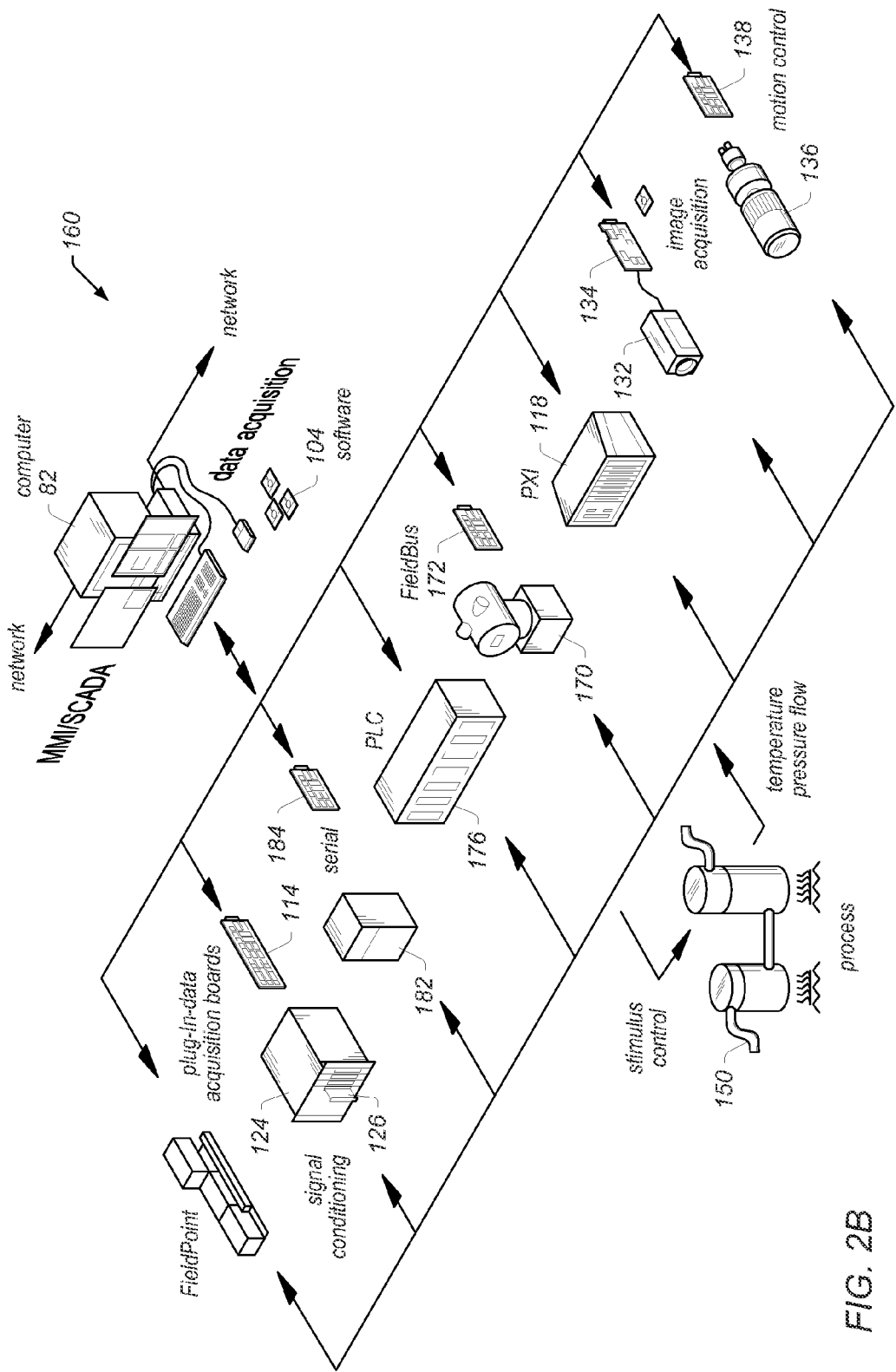
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others. Similar to above, embodiments of the data rendering techniques disclosed herein may be used to view or analyze data generated with respect to the process or device 150.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
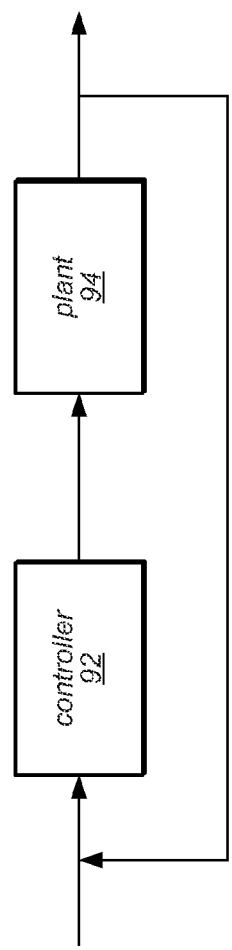
FIG. 3A is a high level block diagram of an exemplary system which may execute or utilize embodiments of the present invention.

FIG. 3A is a high level block diagram of an exemplary system which may execute or utilize programs according to embodiments of the present invention. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a program that specifies or implements the functionality of one or both of the controller 92 and the plant 94. For example, a control engineer may use a modeling and simulation tool to create a model (program) of the plant 94 and/or to create the algorithm (program) for the controller 92. Embodiments of the data rendering techniques described herein may be used to query for and retrieve data for display, e.g., to monitor or analyze the system.

Figure 3B:
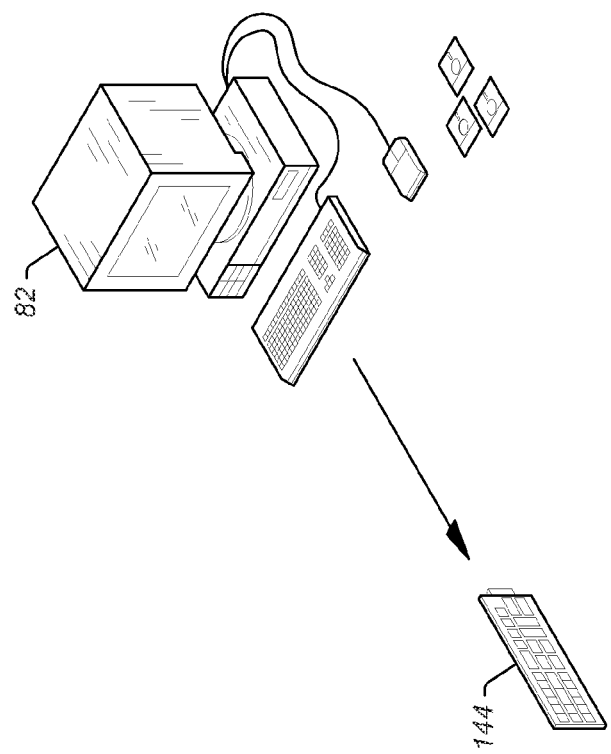
FIG. 3B illustrates an exemplary system which may perform control and/or simulation functions utilizing embodiments of the present invention.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a program. In a similar manner, the plant 94 may be implemented by a computer system or other device 144 (e.g., including a processor and memory medium and/or including a programmable hardware element) that executes or implements a program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a program, e.g., a graphical program, and the program may execute on the controller 92, e.g., on a computer system or other device. The computer system 82 may be a platform that supports real time execution, e.g., a device including a processor that executes a real time operating system (RTOS), or a device including a programmable hardware element. Embodiments of the data rendering techniques described herein may be used to query for and retrieve data for display, e.g., to monitor or analyze the process.

In one embodiment of the invention, one or more programs, e.g., graphical programs, may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a program) is executed in real time to make the real controller 92 "believe" or operate as if it is connected to a real plant, e.g., a real engine. As with the above examples, embodiments of the data rendering techniques described herein may be used to query for and retrieve data for display, e.g., to monitor or analyze the controller or plant (model).

In the embodiments of FIGS. 2A, 2B, and 3B above, one or more of the various devices may couple to each other over a network, such as the Internet.

Figure 4:
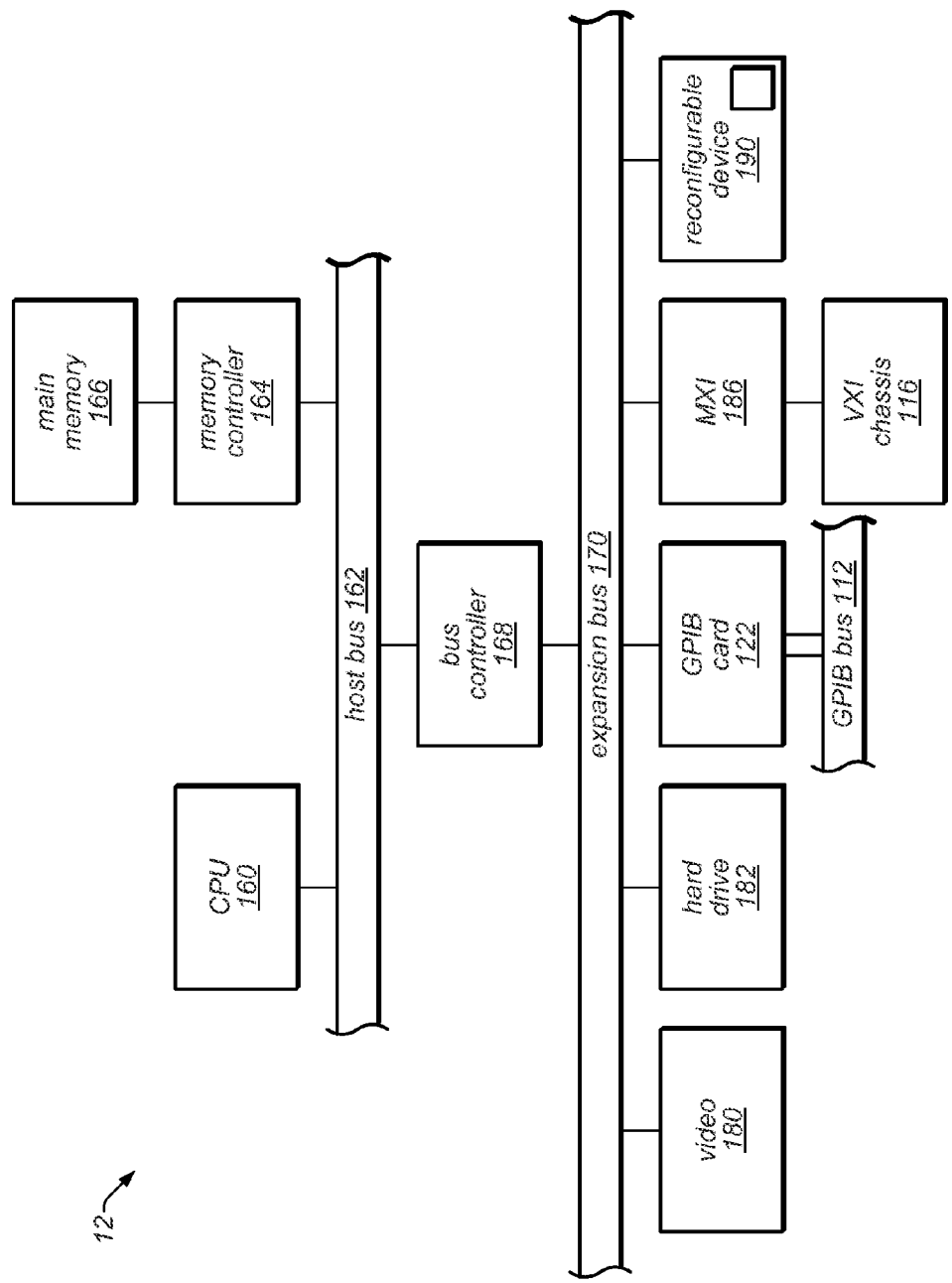
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store software, e.g., graphical programs, configured to implement embodiments of the data rendering techniques disclosed herein. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a (possibly graphical) program to the device 190 for execution of the program on the device 190. In embodiments where the program is a graphical program, the deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5:
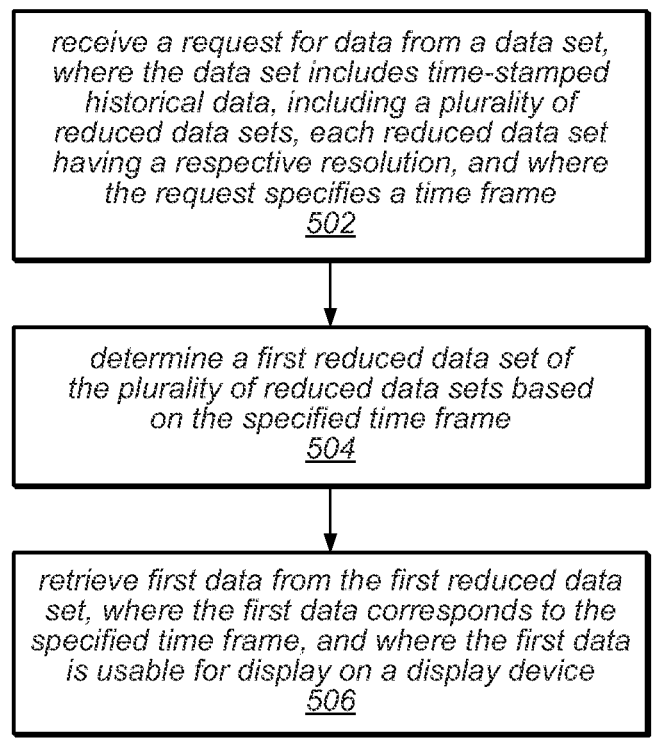
FIG. 5 is a flowchart diagram illustrating one embodiment of a method for rendering data with specified constraints.

FIG. 5—Flowchart of a Method for Rendering Data

FIG. 5 illustrates a method for rendering data in accordance with specified constraints. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502, a request for data from a data set may be received. The data set may include time-stamped historical data, and may include a plurality of reduced data sets, each reduced data set having a respective resolution. The request may specify a time frame, i.e., may indicate a time range for which data from the data set is desired. For example, in one exemplary case, the request may specify a particular month, e.g., August, 2012. The data set may be associated with a data channel, referred to simply as a "channel", which may have a specified data type, and which may continuously, periodically, or intermittently, provide the data of that data type to and of the data set. Note that the specified data type may be a primitive data type, e.g., a numeric type such as integer, double, or float (among others), a Boolean type, or a machine data type; or may be a composite data type, e.g., an array, record, union, tagged union, set, object, etc., as defined by a user or application. Thus, for example, a "double channel" (primitive numeric data type) may define or refer to a data channel containing data items of data type "double", where each data item has an associated time stamp. Moreover, the data channel may be specified as having "infinitive" (or infinite) length, meaning that it may be ongoing, and thus not have a defined endpoint or final amount. As another example, a "geographical channel" (composite data type) may be a data channel (also of "infinitive" length) containing data items of data type "geography", each with an associated time stamp, where an item of geography data type includes three double values defining longitude, latitude, and elevation of a geographic position. Thus, in various embodiments, the (maximum) specified number of data points in an interval may be 4, 3, 2, or any other value as desired, depending on the application and/or data type of the data points.

In 504, a first reduced data set of the plurality of reduced data sets may be determined based on the specified time frame. In other words, one of the plurality of reduced data sets may be identified based on the time range specified by the request.

In 506, first data from the first reduced data set may be retrieved. The first data may correspond to the specified time frame, and may be usable for display on a display device, e.g., a tablet computer, smartphone, laptop, or workstation monitor. In other words, the requested data may be returned to the client or user, e.g., for display.

The data set may be generated in any of a variety of ways, and may facilitate requests for reduced (and possibly optimized) datasets for specified time frames (e.g., per the method described above), which can be used for views in charts, graphs, and so forth, as desired.

In one embodiment, on data ingress, i.e., upon receiving the original data set, e.g., the raw data of the data set, the received data may be reduced via multiple reduction stages to generate a corresponding plurality of reduced data sets, each of which is at a respective resolution. The generated reduced data sets may be stored, e.g., with, or associated with, the original data. More specifically, in some embodiments, raw data of the data set may be received, where the raw data includes time-stamped historical data at a first (e.g., original) resolution. The raw data may be reduced (via multiple reduction stages), thereby generating the reduced data sets at their respective resolutions. The reduced data sets may be stored in a memory medium, e.g., for subsequent retrieval, e.g., per an embodiment of the above method.

Thus, the raw data may be reduced in multiple reduction stages beginning with an initial stage, where reduction at each subsequent stage may be based on reduced data from the previous stage. In some embodiments, the intervals at each subsequent stage may be larger and data resolution may be smaller than the intervals and data resolution at the previous stage, respectively.

The reduction approach may be optimized for displaying data in charts (or graphs, or other graphical presentation means). For example, if the typical or expected display device is only capable of displaying, say, three thousand data points, then returning more than this amount may not be useful, and may thus require more bandwidth than necessary. Additionally, such larger than necessary data returns may require further reduction of the data for actual display on the device. Accordingly, one or more constraints on return data size range may be specified, e.g., depending on expected use cases, which may be used to determine how many stages of data reduction to perform, and thus, how many reduced data sets are generated. More specifically, in one embodiment, a return data constraint that limits the return data size for requests to a range, e.g., possibly in terms of a display resolution, may be specified for the amount of data to be returned in response to a request. The range, or limits on an amount of data that may be returned, may be specified in any of various ways, e.g., a number of intervals (described in more detail below), a number of pixels (e.g., display area limitation), a number of data points, a number of bits or bytes, etc., as desired. This specified range (or value) may thus determine the number of reduction stages to perform, and corresponding reduced data sets (with respective resolutions) to generate, such that for a given requested time frame, an appropriate reduced data set may be selected.

In some embodiments, the actual returned data size may be related to and limited or constrained by the specified return data constraint, but may not be numerically less than, equal to, or greater than, the specified return data constraint, depending on the actual channel data, the used reduction stages and the performed optimization steps. For example, the return data size may be in different units than the specified return data constraint (which may be in terms of "intervals" or "x-pixels"), as will be described below. In some embodiments, the selection of the reduced data set may include selecting the reduced data set with the highest resolution possible that will keep the return data size within the specified bounds.

Thus, depending on the defined time frame of a request from a client (or user), the method may dynamically analyze which reduced data set, e.g., which data stage of which resolution, is adequate, and may fetch the specified data from that reduced data set and return the fetched data to the client (or user). Note that in general, the longer the time frame of the request, the lower the resolution (and thus, higher reduction) of the returned data set. For example, requesting the data of a month may result in receiving data at a resolution of a data point per hour, while requesting the data of just the last day of that month may result in receiving data at a resolution of a data point per minute. Thus, with each request, an amount of data within some specified range may be returned, independent of the time frame specified in the request, e.g., a maximum of a few thousands data points.
Reduction and Constraint In one exemplary embodiment, the reduced data sets may be specified or organized in terms of (e.g., time) "intervals", where each interval includes up to some specified number of data points, possibly dependent on the data type of the data points in the data set, e.g., up to 4 points for data points of type "double", or up to 2 points for "geographic" data type, e.g., latitude, longitude, and elevation, as noted above. The following description is in terms of the former, although the particular values used are meant to be exemplary only, and other values may be used as desired, depending on the application and/or data type.

Figure 8:
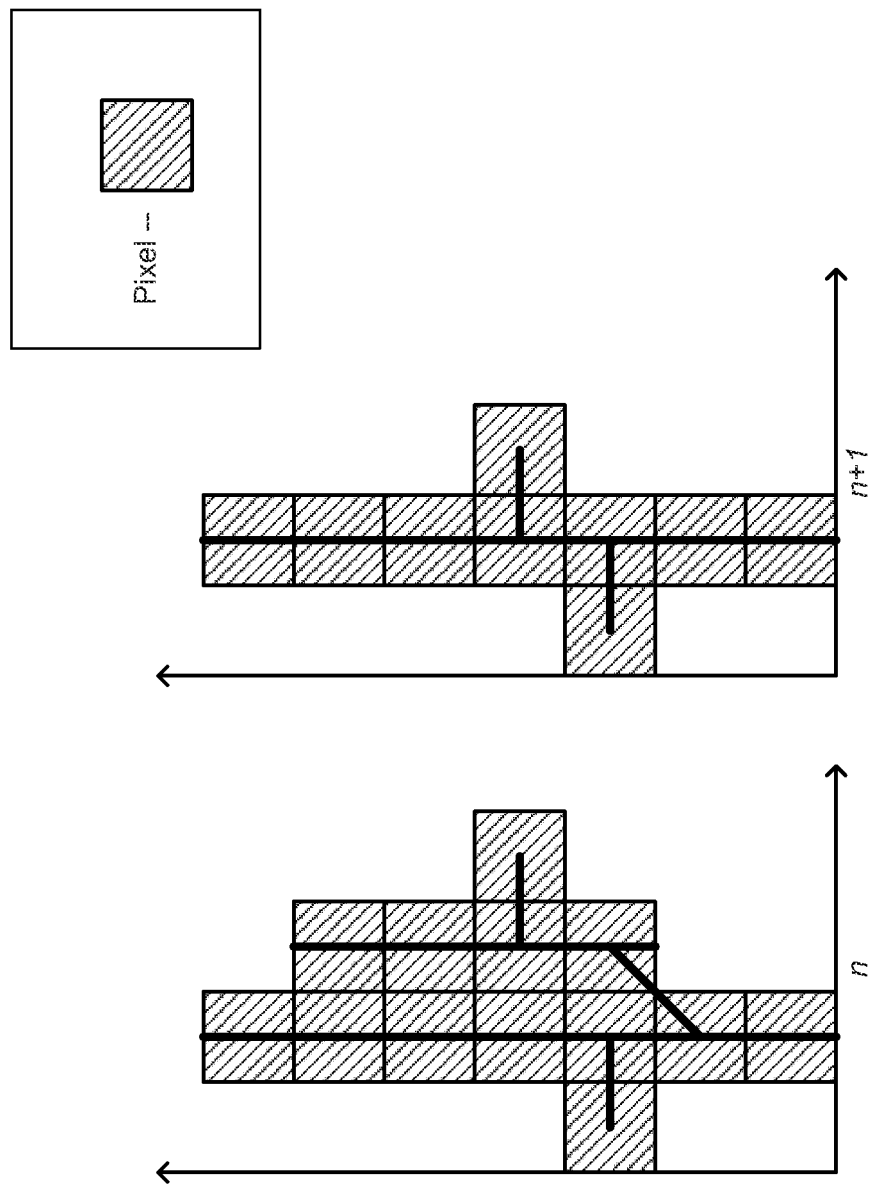
FIG. 8 illustrates a simple example of data reduction by a factor of two, according to one embodiment.
Figure 9:
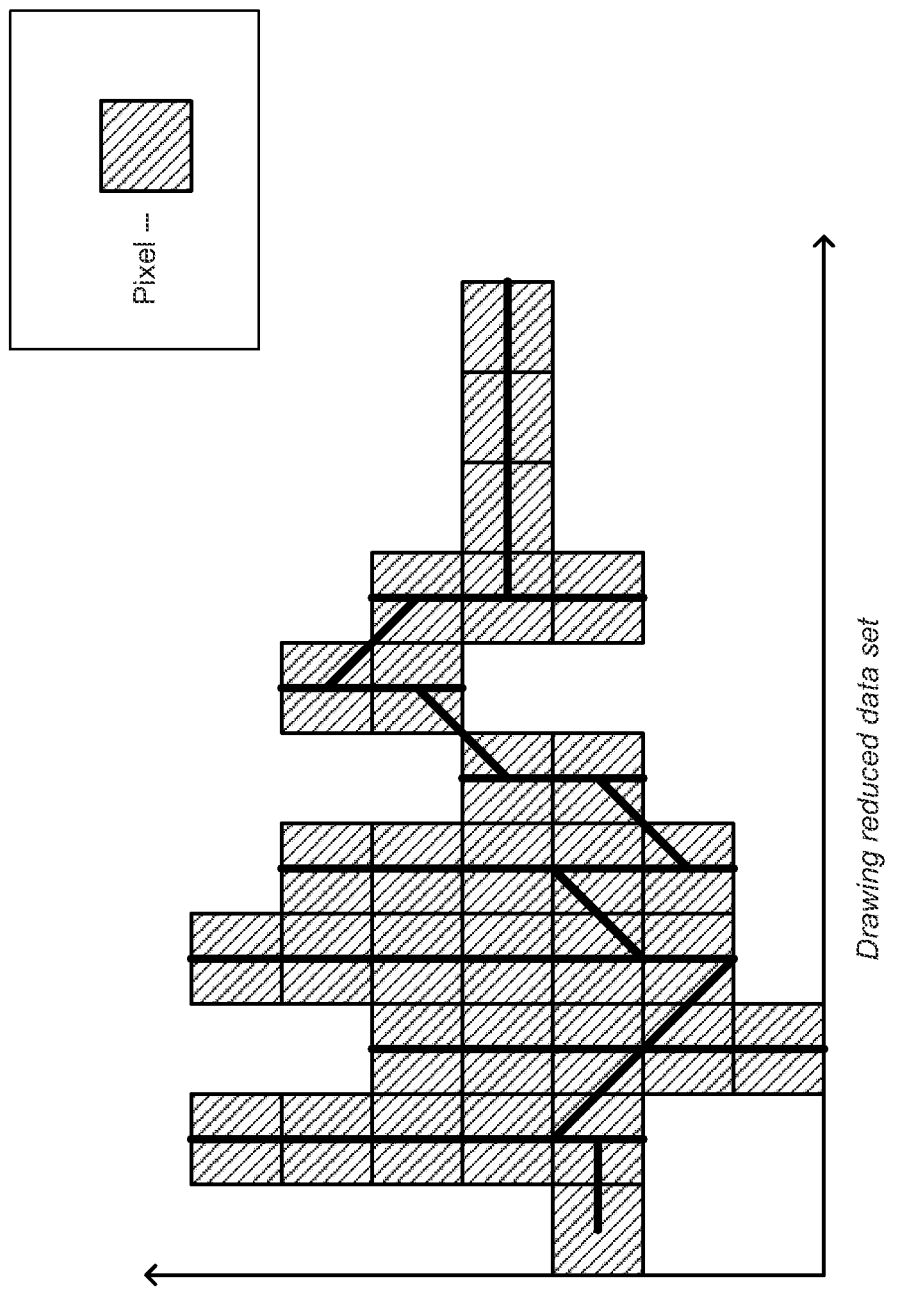
FIGS. 9 and 10 illustrate a reduced data set displayed according to one embodiment of the present techniques.
Figure 10:
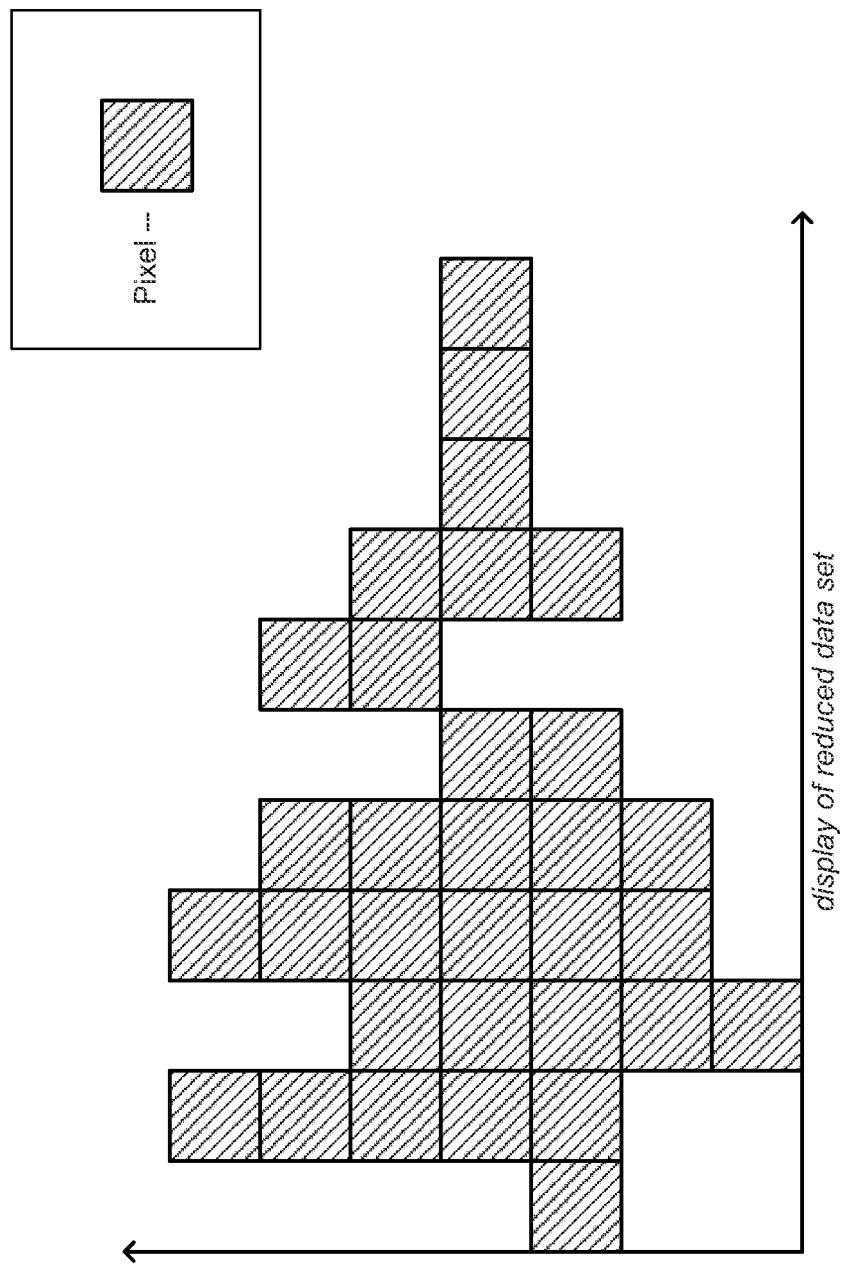

In some data sets, the data may not be exactly regular, time-wise (or with respect to some other independent variable), and so, given a specified interval size in the original (raw) data set, e.g., 1 minute, etc., with an upper bound on the number of points per interval, e.g., 4, there may be some intervals with no data points, and others with 1, 2, 3, or 4 data points. Now, when any requested data are returned for display, the rendering software (and/or hardware) simply takes the returned data points, and connects them in order. Depending on the reduction techniques used to generate the various reduced data sets, this could result in unwanted artifacts in the display of the returned data, e.g., if the reduction process retained uncharacteristic data points for a reduced interval. Embodiments of the present approach may facilitate compression of a given interval (e.g., containing up to 4 data points) to a reduced width of one pixel (on an expected display) with a vertical spread or height that represents the range of the data over that interval. Subsequently, when the data are displayed, each interval may be represented by a vertical line, 1 or more pixels in length, which results in a display of the data that is visually pleasing and technically accurate, as illustrated in FIGS. 8-10, described below.

Accordingly, in one embodiment, the reduction process may determine, per interval, one or more characteristic data points for the interval, specifically, first, last, minimum, and maximum, data points in the interval, which may serve to characterize the data for that interval. Such characteristic data points may be used to guide the reduction process such that when the reduced data are returned and displayed, the displayed data properly represent the original (raw) data at the reduced level of resolution at which the data are displayed.

For example, consider an exemplary case of four adjacent intervals, A, B, C, and D, where interval A includes 4 data points, interval B contains no data points, interval C includes 1 data point, and interval D includes 3 data points. Now, interval A has first and last data points, and thus has well-defined connection points for adjacent intervals (first and last points), and further has min and max points, and thus a characterized data range or spread (min and max points). Interval B has no points, and thus may be represented by simply connecting the last point of interval A and the first point of interval C. In other words, no data points are synthesized, but the adjacent data may suffice to visually render the empty interval as simply connecting data of the two adjacent intervals. Interval C includes 1 data point, which thus fills the roles of min, max, first, and last, data points, and thus provides a clear connection to previous and subsequent data points. Finally, interval D, which includes only 3 data points, is still guaranteed to have a first point, a last point, a min point, and a max point, but two or more of these characteristic points may be the same point; e.g., the first point may be the minimum, the last point may be the maximum, etc., and thus, the data of interval D may thus simply be connected to the single point of interval C via the first point of interval D. Thus, even though intervals may have zero to 4 data points, the interval may still be properly characterized, either by the 1-3 characteristic data points of the interval, or, in the case of zero data points, characteristic points of the adjacent intervals.

Describing the above in a slightly different way, in some embodiments, the first reduced data set (of 502) may be specified or organized in intervals along an independent axis, where each interval includes between zero and a specified number of data points. The method may further include: for each interval that includes one or more data points, determining one or more characteristic data points for the interval, including first, last, minimum, and maximum, data points in the interval. The characteristic data points for the interval characterize the data for that interval, and the one or more characteristic data points may be associated with a respective single value on the independent axis for the interval.

The intervals may be displayable in the following manner:

For intervals that include one or more data points: a vertical line may be presented (displayed) at the respective single value on the independent axis for the interval, where endpoints of the vertical line are values on the dependent axis of the minimum and maximum data points for the interval. The vertical line may be connected to an immediately previous interval that includes one or more data points via a line from the last data point of the immediately previous interval to the first data point of the interval, where the connecting crosses any intervening empty intervals between the interval and the immediately previous interval that includes one or more data points. Similarly, the vertical line may be connected to an immediately subsequent interval that includes one or more data points via a line from the last data point of the interval to the first data point of the immediately subsequent interval, where the connecting crosses any intervening empty intervals between the interval and the immediately subsequent interval that includes one or more data points.

Accordingly, any returned data whose intervals retain the above characteristics may unambiguously be rendered by display software/hardware.

Note that in some embodiments, even though the requested data are returned as a set of ordered data points, since each interval is compressed or reduced to a single x-pixel position (e.g., time value, or other independent variable), the characteristic data points (assuming at least 1 data point) may specify that a vertical line be drawn at that single x-pixel position, vertically spanning the min value to the max value, and connected to the adjacent interval's corresponding vertical lines via the first and last points, respectively. Thus, from the rendering process's point of view, the vertical line may be drawn in the temporal order of the characteristic points, where, for example, a connection is made from the previous interval's exit point (last point, or if there are no points in that interval, that of the twice previous interval, and so forth) to the present interval's first (entry) point, then, possibly through up to 2 interior points, to the interval's last point, and so forth. Thus, in some embodiments, each interval may be represented in a manner similar to candlestick charting in technical stock analysis, with "open", "close", "low", and "high" values characterizing the data. Thus, when the data are rendered, the result may be a sequence of vertical line segments, connected to one another in accordance with their first and last points (with special handling of empty intervals, per the above). Note that at each stage of reduction, the intervals considered generally increase in duration, although the data for each interval will still have the above characteristics, e.g., 0-4 data points characterizing the interval in terms of first, last, min, and max points for the interval. The above process may thus guarantee that, for a given number of intervals, there will be at most 2*n+2 data points, as will be explained in more detail below.

In some embodiments, the request may itself specify the return data constraint, e.g., "100 intervals", "100 pixels", etc. However, there may not be a reduced data set that meets this criterion in addition to the specified time frame. Accordingly, in some embodiments where the request further specifies a return data constraint, the retrieving first data from the first reduced data set may include retrieving initial data from the first reduced data set, where the initial data has an initial size at an initial resolution, and where the initial size is greater than that allowed by the specified return data constraint. Accordingly, the method may include further reducing the initial data to an adjusted size that is less than the initial size, and in some embodiments, does not violate the specified return data constraint, thereby generating the first data, which may be returned to the user or client. In other words, the method may dynamically reduce the retrieved initial data to an even lower resolution to meet the return data constraint specified by the request. Note, however, that in some embodiments, the specified return data constraint may be a soft constraint (as opposed to a hard constraint). In other words, the method may attempt to meet the constraint, and may reduce the initial data some, but may not force the result to be less than or equal to the specified return data constraint.

In one embodiment, the adjusted size may be of the same order as the specified return data constraint and may not exceed 2*n+2, where n is the specified return data constraint in terms of intervals or (x axis (time)) pixels (assuming the above definition of interval and characteristic values). Moreover, in some embodiments, the return data constraint may be based on a specified graphical presentation device that limits the size or resolution regarding displaying data in charts or graphs, as illustrated below with reference to FIGS. 8-10.

Thus, the request may (optionally) specify a number of intervals, thereby constraining the return data size. It should be noted, however, that if endpoints of the intervals are allowed to overlap, the number of corresponding data points may not simply be the number of intervals times the number of points per interval. For example, consider a client requesting data for a time frame, and further specifying 100 intervals corresponding to a resolution of 100 horizontal pixels to display, the method may return up to 4 data points for each horizontal pixel (e.g., time position) to allow drawing a good approximation of the curve. Even though there might be 400 data points available for the requested 100 intervals, the method may not return up to 400 data points (100 intervals*4 data points/interval), because input and output of the intervals overlap and the retrieved data set may instead contain only up to a maximum of 202 (2*100 intervals+2) data points.

As another illustrative explanation regarding the above use of "pixels" and "intervals", note that to display a curve (of discrete points) in a 2D graph one must connect two data points by a simple line. In case multiple data points fall onto the same x-pixel (due to resolution) the line that needs to be drawn will connect the minimum and the maximum of the y-pixel.

In case that data burst falls on a single x-pixel, the display algorithm or process needs to connect the minimum and maximum of the y-pixel, but how to draw the "line" from the predecessor x coordinate may not be obvious. For example, connecting to the minimum or maximum can be totally wrong, so another y-pixel may be needed to connect with the predecessor and a (different) y-pixel to connect with the successor. Accordingly, one may need 4 y-pixels on a single x-pixel, which explains the need for up to 4 data points per interval as discussed above.

As another exemplary optimization, in case multiple data points directly follow each other, it may not make sense to provide the overlapping output (successor) and input (predecessor) data points, and so they may be omitted. Accordingly, in the above case that 100 intervals of a given time frame are requested, the method may return 202 data points at maximum. Optimization of data may also be applied in cases where the minimum or maximum equals the output (successor) or input (predecessor) data point.

In some embodiments, the request might not explicitly specify the (desired) return data size, but such a constraint may still be applicable, e.g., as a default value, or as the result of a query of preferences, configuration, or display software or hardware. For example, in one embodiment, the size constraint (be it in terms of data points, intervals, pixels, bit/bytes, or other units) may be an optional parameter for the request, whereby the user has the option to specify this constraint.

In some embodiments, the method may not interpolate or compute any non-existing data points i.e., data points not in the original data set. Moreover, in various embodiments, the data reduction may be performed in any of a variety of ways, as discussed below in more detail.

FIGS. 6-10—Data Reduction and Display

Figure 6:
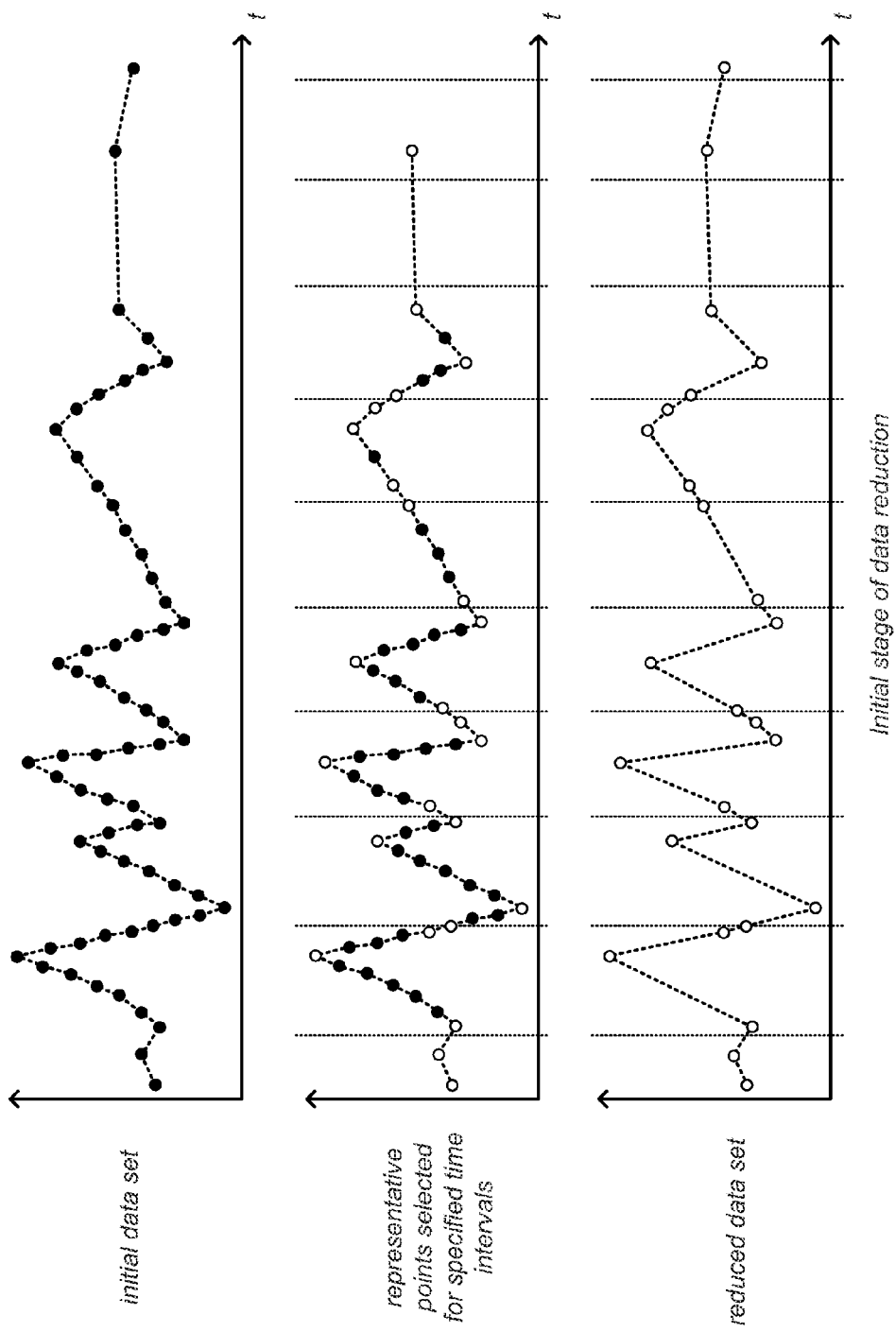
FIG. 6 illustrates a first stage of data reduction, according to one embodiment.

FIGS. 6-9 illustrate exemplary data reductions, where an initial data set, e.g., the received raw data of 502, is reduced in multiple (reduction) stages to generate multiple reduced data sets, and FIG. 10 illustrates an exemplary display of the reduced data, according to one embodiment. FIG. 6 illustrates an initial data reduction applied to an exemplary (raw) data set. More specifically, FIG. 6 illustrates reduction for an exemplary double channel.

As may be seen, at the top of the figure is a time chart of an initial data set. Note that the data points, shown as black circles are not perfectly spaced in time, e.g., are at least somewhat irregular.

Shown in the middle of FIG. 6 is a time chart where specified time intervals are marked, and further, where representative points of the specified time intervals are shown, displayed as white circles, i.e., "key" data points are indicated for each interval for retention in the reduction process. Thus, in one embodiment, for some data types, e.g., for double (data type) channels, the method may pick only existing data points which are meaningful to describe a certain time interval, which is the first data point of the interval, the last data point of the interval, the minimum data value of the interval and the maximum data value of the interval; the so called characteristic values. In case one or more of these characteristic values fall onto the identical data point, that data point will only be considered once by this optimizing the number of data points per interval to be stored.

However, other data types may not be handled in this manner. For example, in some embodiments, the method may not have an optimization algorithm for key data point selection for reduction of geography data on a map, and so for geography channels, every $n^{th}$ value may be selected (retained). Note, however, that using this approach for double (data type) channels, i.e., taking every $n^{th}$ value, may not be acceptable, as it may result in very unrepresentative data points, especially for signals with changing sampling frequency or high reduction rates.

Finally, the bottom time chart of FIG. 6 shows a reduced data set (of double data type) produced by the reduction process. Note that each interval includes from 1 (or even 0) to 4 data points. Thus, as discussed above, a request specifying a number of intervals (in addition to time frame) may not translate to a particular bounding data amount (return data size), or in a simple straightforward way, but may still provide a constraint on the amount of returned data.

Figure 7:
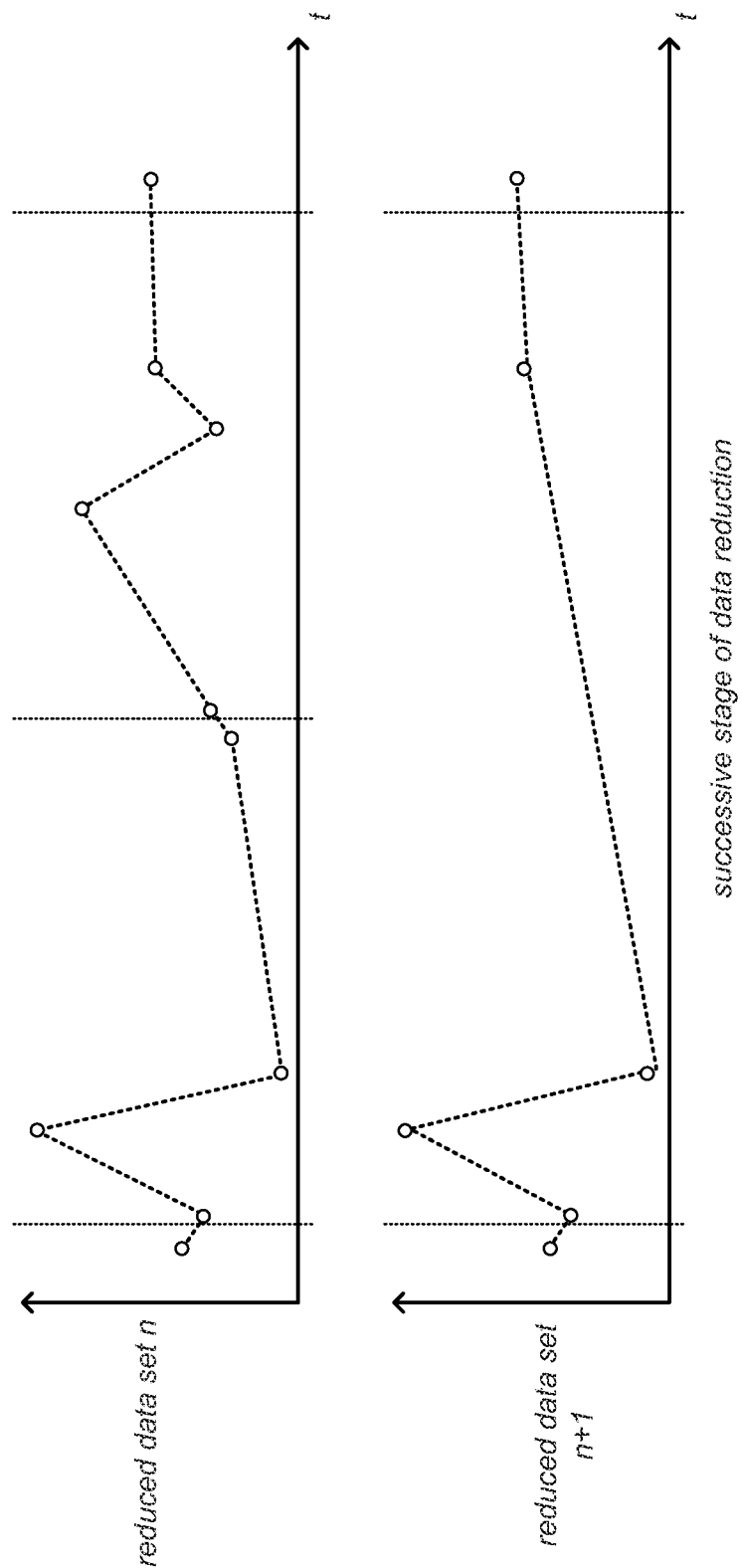
FIG. 7 illustrates a successive stage of data reduction, according to one embodiment.

FIG. 7 illustrates two successive stages of data reduction, according to one embodiment, where a reduced data set n is further reduced to generate reduced data set n+1. As shown, for this reduction stage, several time intervals are combined to form a new interval, and again, up to four meaningful data points are chosen. This reduction process may be repeated for several stages, where in some embodiments, each successive stage's time intervals (and resulting reduced data set) may cover a larger time frame of the specific data set and by this further reduces the data of the previous stage resulting in a lower resolution compared to the previous stage. In other words, at each successive stage of reduction, the (time) intervals into which the data are partitioned may be larger, but may have lower resolutions.

FIG. 8 illustrates the exemplary data reduction of FIG. 7, i.e., for two (internal) intervals at stage n to a single (internal) interval at stage n+1, where hatched boxes represent contiguous (square) pixels of a display, as indicated, and where the vertical and connecting lines shown serve to guide display of the pixels, e.g., illustrate the drawing algorithm, but are themselves not actually presented on the display, at least because the display lacks sufficient resolution, being limited to pixels of the size shown. Note that the left and right borders/pixels of the (small) data set shown are assumed to match the first and last data points of the internal interval(s). As may be seen, the two internal intervals at stage n have been combined, and characteristic points determined for the combined interval, which are then used to visually represent the resulting reduced data set of stage n+1.

FIG. 9 illustrates the rendering or drawing of the reduced data set of FIG. 6, with drawing algorithm lines shown in accordance with the technique described above, and FIG. 10 illustrates display of the same reduced data set, but without showing the drawing algorithm lines. Thus, FIG. 10 illustrates display of an exemplary reduced data set according to one embodiment of the techniques disclosed herein. Note again, that the display of FIG. 10 (and FIGS. 8 and 9) is somewhat magnified to show how the rendering of the data is implemented at the pixel level.

By using this principle, the request can be processed fast and efficiently and the costs are in the same range as other requests. The amount of data returned back is adequate for being processed quickly and displayed in charts or maps, or with other displaying methods.

Note that in one embodiment, the reduction process for geography channels may be simpler, since the method may only pick up to two values per interval. As noted above, in some embodiments, for both channel types, double and geography, (and possibly others) the method may not interpolate or compute any non-existing data points, i.e., only existing data points may be used and/or returned.

Table 1 illustrates exemplary data reduction for a data set with a duration on the order of a year, according to one embodiment, and further shows related information regarding intervals, valid time frames, maximum values, and maximum storage overhead required per year.

TABLE 1

Exemplary Data Reduction Stages and Effects

| stage | reduction factor to prev. stage | quantized time interval | intervals per Day | intervals per year | valid request time frame | max values per request | max size per year [MB] |
|---|---|---|---|---|---|---|---|
| 1 | — | minute | 1440 | 525600 | < = 1 day | 5760 | 32.08 |
| 2 | 5 | 5 minutes | 288 | 105120 | >1 day; < = 5 days | 5760 | 6.42 |
| 3 | 3 | 15 minutes | 96 | 35040 | >5 days; < = 15 days | 5760 | 2.14 |
| 4 | 4 | hour | 24 | 8760 | >15 days; < = 2 months | 5952 | 0.53 |
| 5 | 6 | 6 hours | 4 | 1460 | >2 months; < = 1 year | 5840 | 0.09 |
|   |   |   |   |   |   |   | 41.26 |

Per the bottom right value, the maximum storage overhead is ~41 MB per year. per channel.

Table 2 illustrates an alternative reduction schema, according to one embodiment.

| stage | reduction factor time prev. stage | quantized time interval | intervals per Day | intervals per year | valid request time frame | max values per request | max size per year [MB] |
|---|---|---|---|---|---|---|---|
| 1 | — | minute | 1440 | 525600 | < = 1 day | 5760 | 32.08 |
| 2 | 10 | 10 minutes | 144 | 52560 | >1 day; < = 10 days | 5760 | 3.21 |
| 3 | 6 | hour | 24 | 8760 | >10 days; < = 2 months | 5952 | 0.53 |
| 4 | 6 | 6 hours | 4 | 1460 | > 2 months; < = 1 year | 5840 | 0.09 |
|   |   |   |   |   |   |   | 35.91 |

Per the bottom right value, the maximum storage overhead is ~36 MB per year. Note that because of the bigger resolution loss between stage 1 and 2, this reduction schema may not be appropriate for some applications.

As noted above, in some embodiments, the method may be implemented using one or more graphical programs. A graphical program may be created on the computer system 82 (or on a different computer system). The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created in 502 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer accessible memory medium that stores program instructions executable to perform:

receiving a request for data from a data set, wherein the data set comprises time-stamped historical data comprising a plurality of reduced data sets, each reduced data set having a respective resolution, and wherein the request specifies a time frame and further specifies a return data constraint that limits a return data size;

determining a first reduced data set of the plurality of reduced data sets based on the specified time frame, wherein the first reduced data set is specified or organized in intervals along an independent axis;

retrieving first data from the first reduced data set, wherein the first data corresponds to the specified time frame, wherein said retrieving first data from the first reduced data set comprises:

retrieving initial data from the first reduced data set, wherein the initial data has an initial size at an initial resolution, and wherein the initial size is greater than the specified return data constraint; and further reducing the initial data to an adjusted size that is of the same order as the specified return data constraint, thereby generating the first data, wherein the adjusted size does not exceed 2*n+2 of the specified return data constraint, where n is the specified return data constraint;

for each interval that includes one or more data points, determining one or more characteristic data points for the interval that characterize the data for that interval, and wherein the one or more characteristic data points are associated with a respective single value on the independent axis for the interval; and displaying the first data on a display device, including visually representing the character of the data based on the one or more characteristic data points for each interval that includes one or more data points.

2. The non-transitory computer accessible memory medium of claim 1, wherein the one or more characteristic data points for the interval comprise at least one of: first, last, minimum, or maximum data points in the interval, and wherein said displaying the first data comprises:

for intervals that include one or more data points:

presenting a vertical line at the respective single value on the independent axis for the interval, wherein endpoints of the vertical line are values on the dependent axis of the minimum and maximum data points for the interval;

connecting the vertical line to an immediately previous interval that includes one or more data points via a line from the last data point of the immediately previous interval to the first data point of the interval, wherein said connecting crosses any intervening empty intervals between the interval and the immediately previous interval that includes one or more data points; and/or connecting the vertical line to an immediately subsequent interval that includes one or more data points via a line from the last data point of the interval to the first data point of the immediately subsequent interval, wherein said connecting crosses any intervening empty intervals between the interval and the immediately subsequent interval that includes one or more data points.

3. The non-transitory computer accessible memory medium of claim 1, wherein the program instructions are further executable to perform:

receiving raw data of the data set, wherein the raw data comprises time-stamped historical data at a first resolution;

reducing the raw data, thereby generating the reduced data sets at their respective resolutions;

storing the reduced data sets in a memory medium.

4. The non-transitory computer accessible memory medium of claim 3, wherein said reducing the raw data comprises:

reducing the raw data in multiple reduction stages beginning with an initial stage, wherein reduction at each subsequent stage is based on reduced data from the previous stage.

5. The non-transitory computer accessible memory medium of claim 4, wherein the intervals at each subsequent stage are larger and data resolution are smaller than the intervals and data resolution at the previous stage.

6. The non-transitory computer accessible memory medium of claim 1, wherein the return data constraint is specified by one or more of:

a number of intervals;
a number of pixels;
a number of data points; or
a number of bits or bytes.

7. The non-transitory computer accessible memory medium of claim 1, wherein the return data constraint is based on a specified graphical presentation device that limits the size or resolution regarding displaying data in charts or graphs.

8. The non-transitory computer accessible memory medium of claim 1, wherein the data set is associated with a data channel with a specified data type.

9. The non-transitory computer accessible memory medium of claim 1, wherein the specified data type is a primitive data type.

10. The non-transitory computer accessible memory medium of claim 1, wherein the specified data type is a composite data type.

11. The non-transitory computer accessible memory medium of claim 1, wherein the specified number of data points is 4.

12. The non-transitory computer accessible memory medium of claim 1, wherein the specified number of data points is 2.

13. A method for retrieving data, comprising:

utilizing at least one computer to perform:

receiving a request for data from a data set, wherein the data set comprises time-stamped historical data comprising a plurality of reduced data sets, each reduced data set having a respective resolution, and wherein the request specifies a time frame;

determining a first reduced data set of the plurality of reduced data sets based on the specified time frame, wherein the first reduced data set is specified or organized in intervals along an independent axis;

retrieving first data from the first reduced data set, wherein the first data corresponds to the specified time frame;

for each interval that includes one or more data points, determining one or more characteristic data points for the interval that characterize the data for that interval, and wherein the one or more characteristic data points are associated with a respective single value on the independent axis for the interval, wherein the one or more characteristic data points for the interval comprise at least one of: first, last, minimum, or maximum data points in the interval; and displaying the first data on a display device, including visually representing the character of the data based on the one or more characteristic data points for each interval that includes one or more data points, wherein said displaying the first data comprises, for intervals that include one or more data points:

presenting a vertical line at the respective single value on the independent axis for the interval, wherein endpoints of the vertical line are values on the dependent axis of the minimum and maximum data points for the interval;

connecting the vertical line to an immediately previous interval that includes one or more data points via a line from the last data point of the immediately previous interval to the first data point of the interval, wherein said connecting crosses any intervening empty intervals between the interval and the immediately previous interval that includes one or more data points.

14. The method of claim 13, wherein said displaying the first data further comprises:

for intervals that include one or more data points:
connecting the vertical line to an immediately subsequent interval that includes one or more data points via a line from the last data point of the interval to the first data point of the immediately subsequent interval, wherein said connecting crosses any intervening empty intervals between the interval and the immediately subsequent interval that includes one or more data points.

15. The method of claim 13, further comprising:

utilizing the at least one computer to perform:

receiving raw data of the data set, wherein the raw data comprises time-stamped historical data at a first resolution;

reducing the raw data, thereby generating the reduced data sets at their respective resolutions;

storing the reduced data sets in a memory medium.

16. The method of claim 15, wherein said reducing the raw data comprises:

reducing the raw data in multiple reduction stages beginning with an initial stage, wherein reduction at each subsequent stage is based on reduced data from the previous stage.

17. The method of claim 16, wherein the intervals at each subsequent stage are larger and data resolution are smaller than the intervals and data resolution at the previous stage.

18. The method of claim 13,
wherein the request further specifies a return data constraint that limits a return data size; and
wherein said retrieving first data from the first reduced data set comprises:
retrieving initial data from the first reduced data set, wherein the initial data has an initial size at an initial resolution, and wherein the initial size is greater than the specified return data constraint;
further reducing the initial data to an adjusted size that is of the same order as the specified return data constraint, thereby generating the first data.

* * * * *